(12) United States Patent
DiFonzo et al.

(10) Patent No.: US 10,797,381 B2
(45) Date of Patent: Oct. 6, 2020

(54) DYNAMIC INTERFERENCE REDUCTION FOR ANTENNA BEAM TRACKING SYSTEMS

(71) Applicant: Isotropic Systems Ltd., London (GB)

(72) Inventors: Daniel F. DiFonzo, Rockville, MD (US); Jeremiah P. Turpin, Linthicum, MD (US)

(73) Assignee: Isotropic Systems Ltd., London (GB)

( * ) Notice: Subject to any disclaimer, the term of this patent is extended or adjusted under 35 U.S.C. 154(b) by 0 days.

(21) Appl. No.: 16/298,491

(22) Filed: Mar. 11, 2019

(65) Prior Publication Data

US 2019/0288378 A1 Sep. 19, 2019

Related U.S. Application Data

(60) Provisional application No. 62/640,960, filed on Mar. 9, 2018.

(51) Int. Cl.
| | |
|---|---|
| *H01Q 1/24* | (2006.01) |
| *H01Q 25/00* | (2006.01) |
| *H04W 16/28* | (2009.01) |
| *H04B 7/185* | (2006.01) |

(52) U.S. Cl.
CPC .......... *H01Q 1/246* (2013.01); *H01Q 25/008* (2013.01); *H04B 7/18504* (2013.01); *H04B 7/18513* (2013.01); *H04W 16/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,720,712 | A | 1/1988 | Brookner et al. | |
| 7,720,472 | B1 * | 5/2010 | Feria ............... | H04B 7/18504 342/381 |
| 7,970,348 | B2 * | 6/2011 | Hagerman ........ | H04W 16/28 370/203 |
| 8,676,125 | B2 * | 3/2014 | Nanda .............. | H04B 7/024 455/63.1 |
| 9,252,868 | B1 * | 2/2016 | Bull ................. | H04B 7/18519 |

(Continued)

FOREIGN PATENT DOCUMENTS

| | | |
|---|---|---|
| WO | WO-99/23718 | 5/1999 |
| WO | WO-99/46829 | 9/1999 |

OTHER PUBLICATIONS

International Search Report & Written Opinion for PCT/IB2019/051963, dated Jul. 25, 2019, 14 pages.

*Primary Examiner* — Mamadou L Diallo
(74) *Attorney, Agent, or Firm* — Blank Rome LLP

(57) ABSTRACT

An antenna beam tracking system has dynamic interference reduction. The system includes antennas that can form multiple beams, each beam of which can continually track or point its beams independently in various angular directions. A first beam continually tracks and receives (downlink) signals from a desired source or node such as a satellite or terrestrial node which generally has an apparent motion relative to the antenna. A second beam continually tracks and receives potentially harmful interference signals that may arise from different directions. The signals of the second beam are dynamically coupled to the signals in the first beam in such a manner as to effect cancellation or substantial reduction of the interference.

27 Claims, 5 Drawing Sheets

(56) References Cited

U.S. PATENT DOCUMENTS

| | | | | |
|---|---|---|---|---|
| 2001/0045494 | A1* | 11/2001 | Higgins | B64G 1/1007 244/158.4 |
| 2005/0101352 | A1* | 5/2005 | Logothetis | H01Q 1/246 455/562.1 |
| 2008/0139124 | A1* | 6/2008 | Tillotson | H01Q 1/246 455/63.4 |
| 2011/0216192 | A1* | 9/2011 | Leung | H04N 5/225 348/143 |
| 2012/0314665 | A1* | 12/2012 | Ishida | H01Q 21/28 370/329 |
| 2013/0035052 | A1* | 2/2013 | Musselman | G01S 19/21 455/278.1 |
| 2013/0102254 | A1* | 4/2013 | Cyzs | H04B 1/126 455/63.1 |
| 2014/0099881 | A1* | 4/2014 | Boudreau | H04B 7/14 455/7 |
| 2014/0105054 | A1* | 4/2014 | Sægrov et al. | H01Q 3/2605 370/252 |
| 2014/0135028 | A1* | 5/2014 | Wang | H04W 72/1205 455/452.2 |
| 2017/0353864 | A1 | 12/2017 | Bull | |

\* cited by examiner

DYNAMIC INTERFERENCE REDUCTION FOR ANTENNA BEAM TRACKING SYSTEMS

RELATED APPLICATIONS

This application claims the benefit of U.S. Provisional Application No. 62/640,960, filed Mar. 9, 2018, the entire contents of which are incorporated herein by reference.

BACKGROUND OF THE INVENTION

Field of the Invention

The invention relates to methods and systems for the reduction of interference signals, especially to and from antenna terminals that have one or more independent and dynamically or continually tracking beams for satellite or terrestrial communications in environments where the locations of the desired and/or interfering signals vary with time relative to the local coordinates of the subject antenna terminal.

Background of the Related Art

Interference in an antenna communications terminal, whether from co-channel or adjacent channel co-polarized or cross-polarized sources and whether the sources are in the same spatial direction or spatially different directions, degrades the desired signal and limits the quality of service for such metrics as signal-to-noise plus interference ratio, (S/(N+I)), bit error rate (BER), and effective throughput or spectral efficiency such as data rate per bandwidth of the channel usually expressed as bits/second/Hz. Similarly, transmission of signals from terminals in undesired directions can cause interference into other systems such as satellites or other nodes that appear to me moving with respect to the terminal. Such interference can be problematic for satellite and terrestrial communications systems.

Considerable attention has been given to this subject in the literature and prior art for conventional systems where the apparent locations or beam pointing directions of the desired signals are relatively static or stable with time. The general techniques involve collecting a sample or samples of the interfering signal(s), whether by an auxiliary antenna or antennas, as for example an auxiliary feed or feeds in a reflector antenna, a cross-polarized port in the same antenna, a separate beam of a multi-beam antenna, a separate smaller antenna that may be a low gain antenna with broad angular coverage or a separate directive antenna with its beam pointed to the interfering source where that source may be an adjacent geostationary satellite or other terrestrial source.

The interfering signal from the auxiliary port or antenna is compared with the interference present in the desired channel, for example, by known signal correlation methods or an essentially equivalent digital processing system that identifies the interfering waveform according to its modulation. The sample signal, at least approximately matching the interference in the desired channel, is then introduced into the desired channel in such a way, e.g. weighted amplitude and phase inverted, or in a digital beam forming system is numerically processed in a computer to effectively "subtract" or at least partially cancel the interference signal(s) in the desired channel. This cancellation may be accomplished by analog means or in the digital domain and can be implemented at the radio frequencies (RF), intermediate frequencies (IF), or even at the baseband channel.

Examples of these techniques that sample, cross-couple, and process to reduce interference may be seen in U.S. Pat. Nos. 3,963,990; 6,882,868; 7,336,745; 6,745,018; 8,121,550; and 7,123,676. Sampling and cross-coupling cancellation may also be used to cancel in-band leakage from transmitter to receiver are shown, for instance, in U.S. Pat. Nos. 5,444,864 and 5,125,108, and U.S. Published Application No. 2004/0106381.

So-called Smart Antennas or adaptive antennas can employ phased arrays or multiple antennas where an antenna can use the information from an interfering signal to adjust its radiation pattern to form pattern nulls or partial nulls in the direction of the interference. See IEEE Transactions on Antennas and Propagation, Volume: 24, Issue: 5, September 1976. These have been proposed and used in systems where a hostile interferer (e.g. a jammer) would degrade communications or radar return.

The antenna can form multiple beams by an array of elements connected to a multi-beam network. Examples of analog multiple beam networks include: a Butler Matrix, Butler, J. L. and Lowe, R. "Beam forming Matrix Simplifies Design of Electronically Scanned Antennas", Electronic Design, vol. 9, Apr. 12, 1961; or Rotman Lens, Rotman, W. and Turner, R. F., "Wide-Angle Microwave Lens for Line Source Applications, Trans. IEEE, vol. Ap-11, November 1963; and other multiple beam antennas, R. C. Hansen, "Phased Array Antennas", Wiley, 2009; R. J. Mailloux, "Phased Array Antenna Handbook", Third Edition, Artech House, 2018, where switching among multiple ports is used to optimize the antenna pointing to maximize the signal-to-interference-plus-thermal noise ratio.

Multiple beams may also be obtained with digital beam forming (DBF) techniques, H. Steyskal, "Digital Beamforming Antennas, an Introduction", Microwave Journal, January 1987, pp. 107-124. DBF antennas can form simultaneous multiple beams by numerically processing the signal information. In one example technique known in the art, the received signals are sampled at the individual array elements and undergo analog-to-digital conversion (ADC). The digitized samples are numerically processed using, for example a Fast Fourier Transform (FFT) which can produce as many simultaneous effective beam positions as there are array elements. DBF may also be applied to transmitting antennas as is known in the art by processing digital transmit information (e.g. baseband signals), performing digital-to-analog conversion (DAC), possibly upconverting the resulting analog signals to the RF frequencies and routing these through amplifiers to the transmit array elements.

Adaptive array antennas may dynamically adjust the amplitude and phase weightings of the elements so that their vector sum produces an optimized pattern that minimizes the effect of the interference by, for example, reducing the sidelobe energy in the direction of the interferer or interfered with node.

An extension of this concept is the class of antennas called MIMO (multiple input multiple output), which are used for wireless communications where the signal may experience multipath angles of arrival. such as in U.S. Pat. No. 5,515,378, and J. Litva, "Digital Beamforming in Wireless Communications (Artech House Mobile Communications), Aug. 31, 1996, MIMO systems process multiple signals from different directions and/or polarizations to produce an optimized or "best" output signal. These generally use multiple antenna elements and multiple beam array techniques.

The above prior art generally describes terminals and communications environments where the angular relationships among the desired beam and potential interferers are relatively stable such as for a stationary or fixed terminal platform communicating with geostationary satellites. Even MIMO systems for wireless communications generally involve at least one of the platforms being stationary, such as a base station, where the signals experience multipath forming beams in several directions, as in sectoring, to increase system capacity, D. Ying, et al, Sub-Sector Based Codebook feedback for Massive MIMO with 2D antenna Arrays, 2014 IEEE Global Communications Conference, Austin, Tex., December 2014.

SUMMARY OF THE INVENTION

Mitigation of interference in fully dynamic or time varying interference environments has not been adequately addressed. Methods and design architectures are needed to mitigate interference in a variety of dynamic time varying environments which require continual beam scanning by independent multiple beams. These include, for example: stationary communications platforms where the antenna beam or beams forming the link may be reassigned from one satellite to another as would be the case for a satellite roaming application where traffic is routed among several different satellites and/or operators; mobile platforms communicating with geostationary satellites where the desired and interfering directions are continually changing; mobile or stationary platforms communications with non-geostationary satellites such as those in low or medium earth orbit where the satellites are moving across the sky; mobile or stationary platforms where the antenna system maintains a desired link by continually changing its beam direction to acquire, track and keep the connection. Here, signal acquisition and tracking refers to known methods such as monopulse or beam position dithering to change the antenna beam directions wherein the antenna terminal's control system seeks to maximize the received signal strength of the desired signal. Potential interferers, whether spaceborne or terrestrial, may arise from different directions; and the communications terminal may experience combinations of the above scenarios including tracking the desired signal in the presence of stationary or moving interference sources.

The present invention pertains to methods and systems for the reduction of interference signals to and from antenna terminals that have one or more independent and dynamically or continually tracking beams for satellite or terrestrial communications in environments where the locations of the desired and/or interfering signals vary with time relative to the local coordinates of the subject antenna terminal. The invention more specifically relates to systems and methods for continually tracking the desired and interference sources and continually processing the signals to reduce interference to and from the subject antenna.

The invention pertains generally to antennas that can form multiple beams, each beam of which can continually track or point its beams independently in various angular directions. A first beam continually tracks and receives (downlink) signals from a desired source or node such as a satellite or terrestrial node which generally has an apparent motion relative to the antenna. A second beam continually tracks and receives potentially harmful interference signals that may arise from different directions. The signals of the second beam are dynamically coupled to the signals in the first beam in such a manner as to effect cancellation or substantial reduction of the interference. The principals to be described in the example cases for a small number of beams may be extended in straightforward fashion to many beams and interferers.

These and other objects of the invention, as well as many of the intended advantages thereof, will become more readily apparent when reference is made to the following description, taken in conjunction with the accompanying drawings.

DETAILED DESCRIPTION OF THE INVENTION

Figure 1:
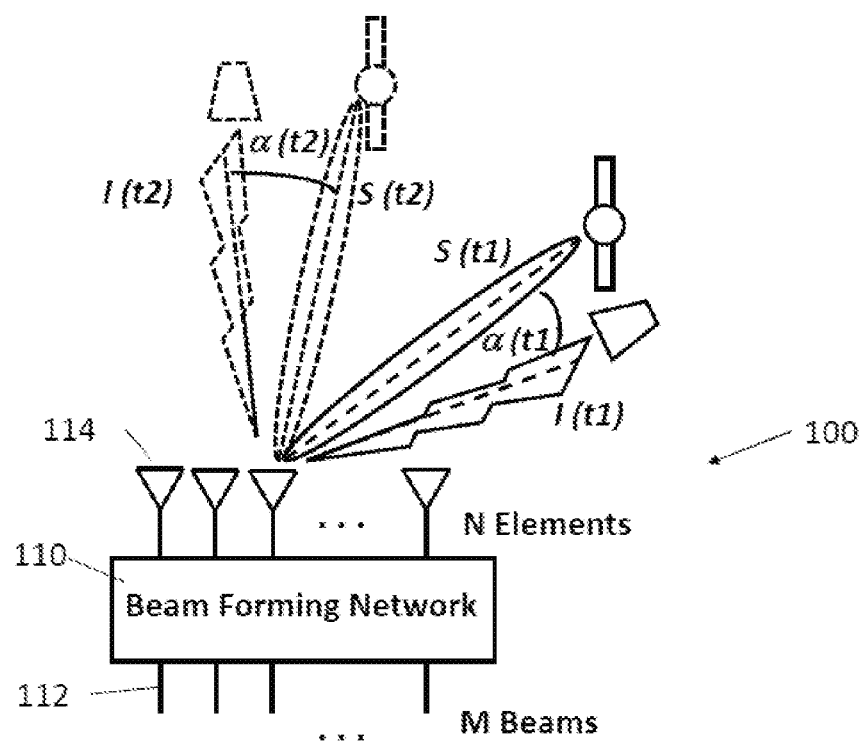
FIG. 1 shows a dynamic beam tracking system in accordance with one embodiment of the invention.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Turning to the drawings, FIG. 1 shows an antenna beam tracking system 100 in accordance with one example embodiment of the invention. The system, shown here for the receive (Rx) or downlink case, includes a Rx beam forming network 110 having M input beams 112 and N elements 114 (e.g., antennas). The beam forming network 110 can be any suitable network, without limitation. For example, for analog systems, the beam forming network 110 can be a Butler matrix and Rotman lens networks that are well understood in the art. The beam forming network 110 can also be, for example, an RF or microwave optical system such as a reflector or lens with multiple feed elements, each feed of which produces a separate beam in different angular directions. U.S. patent Ser. No. 10/116,051, describes an example of such a multiple beam system comprising a phased array of lens elements each of which has multiple feeds. Corresponding feeds in each lens are arrayed together with appropriate time delay or phase shift to form multiple independently steerable beams.

The beam forming network 110 can also be a phased array of directly radiating elements wherein each element has a power divider that feeds two or more separate beam forming networks that each apply phase or time delay to the elements to independently steer the two or more beams. The tracking system 100 is shown in FIG. 2 with a multi-beam antenna 114 having a Beam1 112 that communicates with a desired source S.

The beam forming network 110 can also be a phased array that incorporates digital beamforming (DBF). The receive beam forming network 110 incorporates an RF module that may (but not necessarily) contain amplifiers, mixers, and downconverters followed by analog-to-digital converters. The digitized signals may then be processed to form digital signals representing up to as many simultaneous beams as there are elements. Knowledge of the beam directions and, specifically, one or more desired beam directions, can be applied to the digital signals of a transmit array where they are digital-to-analog converted and sent to the transmit elements. DBF is known in the art for radar and other applications J. Litva, T. Lo, "Digital Beamforming in Wireless Communications," Artech House, 1996.

Thus, the invention can be utilized in a wide variety of beam forming networks 110, and is not intended to be limited to the examples mentioned here merely for illustrative purposes.

As further illustrated in FIG. 1, the apparent position of the source S relative to the antenna 114 may vary with time. Thus, for example, at time, t1, the desired signal is S(t1). An interference source I(t1) may be present at time t1 and may be co-located with S(t1) (e.g., on an orthogonal polarization) or at a different angular location. At a later time, t2, the tracking beam Beam1 changes its beam pointing angle to maintain contact with the desired source and points its beam for the desired signal S(t2). An interference source I(t2) may also be present at time t2. This interfering source I(t2) may possibly be the same interferer that has moved or may possibly be a different interferer.

Figure 2A:
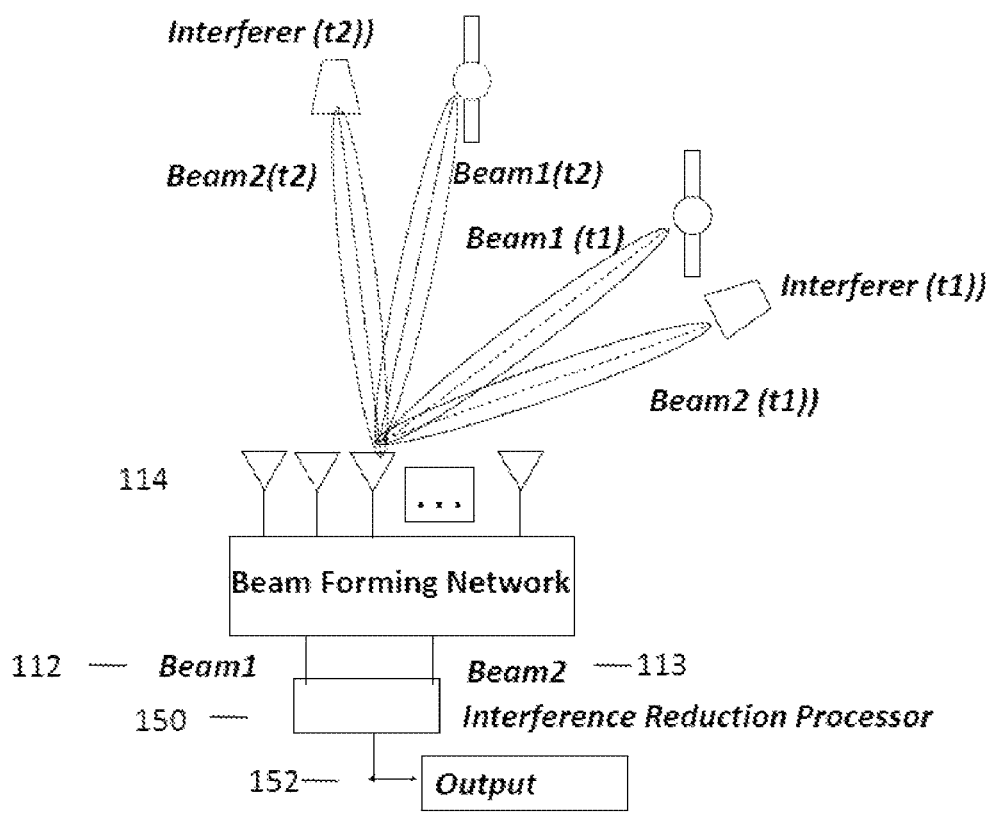
FIG. 2(a) shows the system of FIG. 1 for two independent beams.

FIG. 2(a) depicts the simplified case where the multiple-beam network 110 forms two independent beams at an antenna 114. This can be in any suitable manner, though generally involve variants of phased arrays with multiple beam forming circuits or with networks such as Butler Matrix, Rotman Lens, or digital beamforming (DBF) networks. In addition, an interference reduction processing device 150 is provided in communication with the beam forming network 110. The interference reduction processor 150 receives beams Beam1, Beam2 112, 113 from the beam forming network 110 and generate an output 152. In this case a second beam, Beam2, is formed by the antenna system that continually tracks and points to the interfering source in the direction of signal I, so that the time varying interference is designated I(t2). The Beam1 and Beam2 signals are fed to the interference reduction processor 150.

Figure 2B:
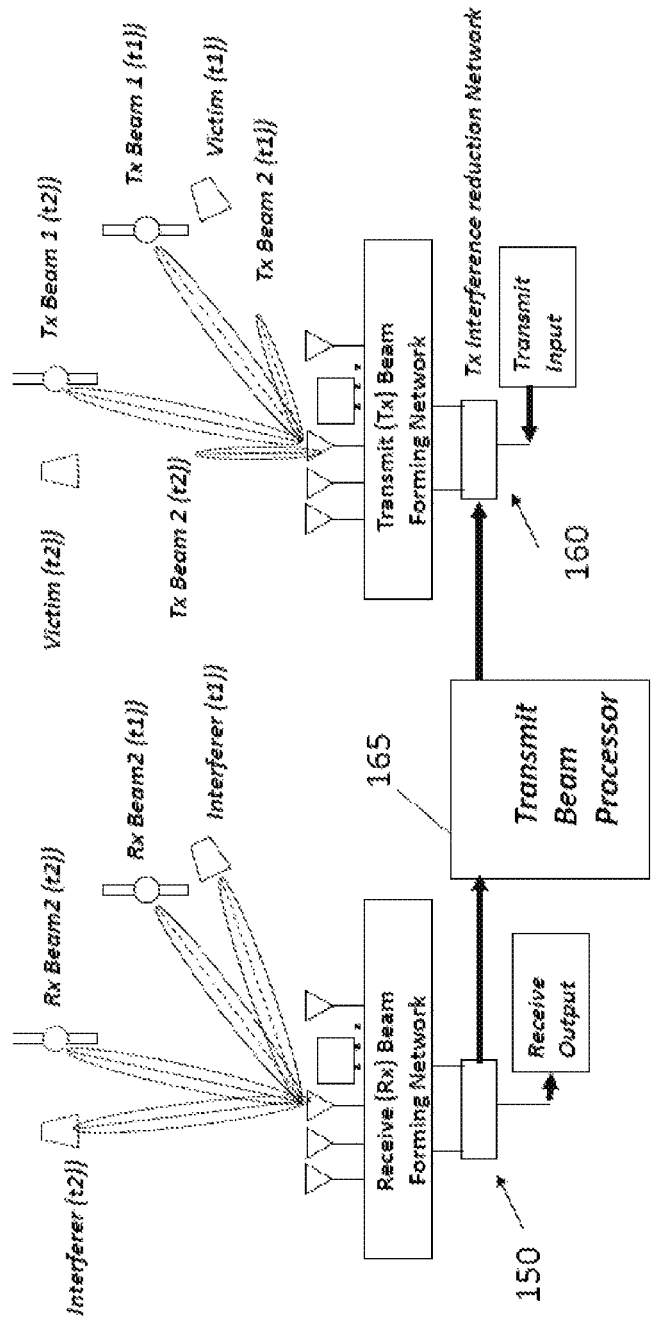
FIG. 2(b) shows the concept of a system for reception (Rx) and transmission (Tx)

FIG. 2(b) further illustrates the concept of a system for reception (Rx) and transmission (Tx). On the left is a reception system that receives signals from the desired source whose location is varying with time as depicted in FIGS. 1 and 2. The information from the received signals is processed by a processing device 165, such as a transmit beam processor as shown. That information is sent from the processing device 165 to the interference reduction processor 160 of the transmit antenna system on the right to reduce or effectively eliminate the transmitted or radiated power in the direction of a victim node. This victim node may, for example, be the same adjacent satellite in orbit that is sending interference into the reception system.

The reception and transmission system shown in FIG. 2(b) may take several forms and are typically co-located, for example, they can be mounted on the same vehicle platform such as a land, air, or marine platform or even a satellite. They may constitute a transmit (Tx) and receive (Rx) single phased array or RF optical system with dual Tx and Rx elements and filters. They may further constitute separate but nearby Tx and Rx apertures. The information from the Rx antenna, whether from analog or digital beamforming networks, is used to alter the shape and/or sidelobes of Tx beam(s) to reduce the transmission of signals in the direction of the victim nodes. The transmit and receive antenna can also be the same antenna element.

Figure 3:
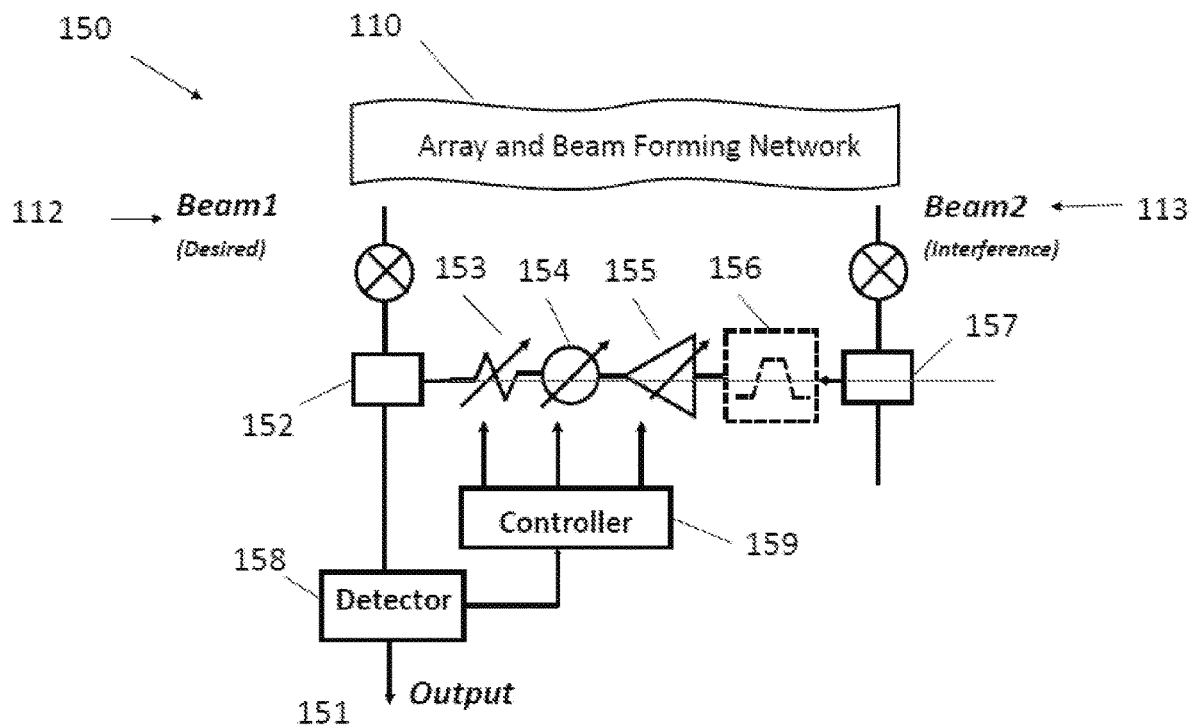
FIG. 3 shows a simplified interference reduction processor in accordance with one embodiment of the invention.
Figure 4:
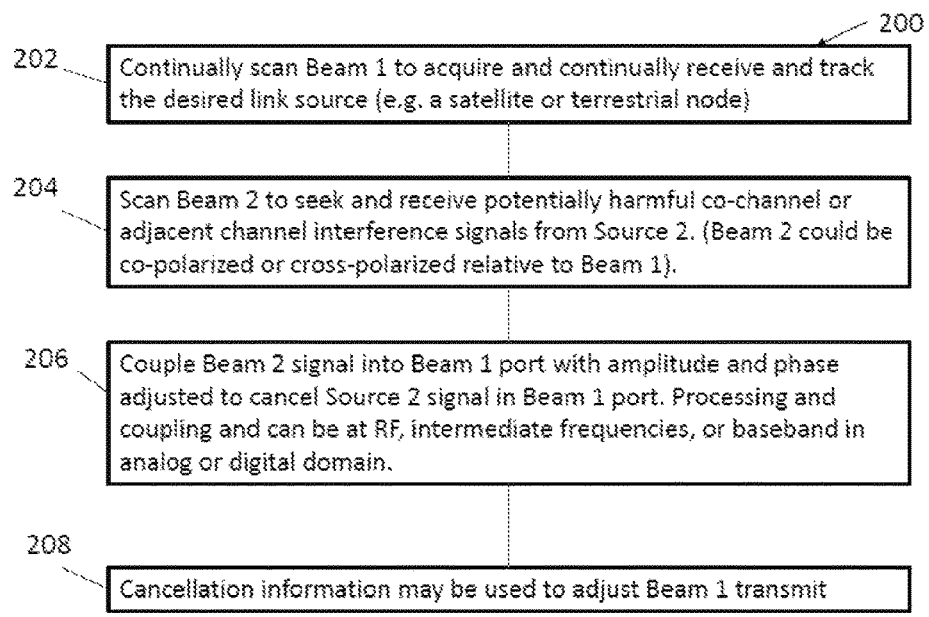
FIG. 4 is a flow diagram of the operation of the system.

FIG. 3 illustrates the interference reduction processor 150 in accordance with one embodiment of the invention, and FIG. 4 shows the general operation 200 of the interference reduction processor 150 for identifying and cancelling or reducing the interference in the desired antenna port. The processor 150 includes a controller 159, variable amplitude control (e.g., a variable attenuator) 153, phase shifter 154, amplifier 155, filter 156, and detector 158. The attenuator 153, phase shifter 154, amplifier 155 and filter 156 together form an interference reduction circuit.

The processor 150 receives the M beams 112, 113 from the beam forming network 110. Thus, at step 202, the processor 150 continually scans Beam1 to acquire and continually receive and track the desired link source S, for example a satellite or terrestrial node. At step 204, the processor 150 scans Beam2 113 to seek and receive potentially harmful co-channel or adjacent channel interference signals from the source 2. Here, Beam2 can be co-polarized or cross-polarized relative to Beam1. Thus, with respect to the two-beam example of FIG. 2, the signals Beam1 112, Beam2 113 may be at the RF frequencies or may be down-converted in FIG. 3 by a respective down-converter to an intermediate frequency, e.g. to represent a transponder channels 152, 157. Down conversion is shown here for example but processing may be carried out at the original RF frequencies.

At step 206, the processor 150 couples the interference signal from the Beam2 113 signal with variable amplitude 153 and phase 154 into the Beam1 port at the inputs to 152 and 157. The coupled signal contains a sample of the interference signal. Here, processing and coupling can be at RF, intermediate frequencies, or baseband in the analog or digital domain. The controller 159 adjusts the amplitude and phase of this sample to eliminate or reduce the presence of the interference in the receive output. The interference device 150 and adjustment is dynamic and continually adapting.

At step 208, cancellation information includes the relative amplitude and phase of the interfering signal Beam2 which is varied by the control or feedback system until signal cancellation is achieved. This information can be in the form of analog signals or, in the case of digital beam forming with analog-to-digital converters (ADCs) and digital-to-analog converters (DACs) can be in the form of digital signals. This information can be compared with that of the desired signal Beam1 and used within a feedback loop to dynamically reduce interference. The same amplitude and phase information, based on the direction of arrival of the interfering signal, transferred to the transmit signal frequencies may be used to adjust the amplitude and phase distribution and thereby the radiation pattern shape and sidelobes of a co-located transmitting antenna as shown in FIG. 2(b) with all elements including amplifiers arranged for the transmit function.

The transmit antenna may be a separate antenna or it may be the same overall structure as the receive antenna but configured for transmit and receive operation according to well-known principals. A feedback loop, where the magnitude of the interference signal is detected by detector 158 in the Beam1 port 112, is fed back to the controller 159. The controller 159 then adjusts the cross-coupling amplitude 153 and phase 154 to minimize the interference. The feedback loop adjusts the amplitude and phase of the interfering voltages (or digital equivalents) to effect cancellation of the interference when coupled to the desired signal Beam1 in 152, thereby maximizing the signal-to-noise plus interference ratio (i.e., S/(N+I)) at the detector 158 output 151. The detector 158 keeps the loop going until the S/(N+I) ratio cannot be further improved. The loop can be on a continuous basis to provide dynamic adjustment of the desired signal.

The process is dynamic in that the interfering signals are combined with the real-time continual beam tracking to effect interference reduction on a time-varying or dynamic basis. Furthermore, while shown here for an intermediate frequency implementation, it can be readily understood that such circuits can be implemented at RF and/or also in the digital domain, e.g. by analog-to-digital conversion and comparing waveforms or even bit streams, performing correlation functions and effecting cancellation.

Thus, the subject antenna terminal 100 may be on a mobile or stationary platform and may be communicating with sources S or nodes including geostationary satellites, non-geostationary satellites, and terrestrial communications nodes. The invention dynamically tracks one or more desired signals while continually searching the angular space in the vicinity of the desired signals for potentially harmful interference sources. The interference sources may appear to be moving relative to the subject antenna platform, whether because of the motion of a mobile platform or by the motion of the sources relative to the platform such as non-geostationary satellites traversing their orbits and thereby moving with respect to the platform, or where both source and platform are moving, or where, even for a stationary antenna, the beams are redirected to other nodes for roaming applications.

The invention identifies the received interfering signals by various means including waveform correlation, typically using signal convolution techniques known in the art depending on modulation, or digital domain processing.

Once the system identifies the interfering signal, it combines the interference signal with that of the desired channel to cancel or reduce interference to the desired channel or channels. The cancellation is a "subtraction" of the interference voltage provided it has been inserted at 152 with the proper amplitude and phase or, in the case of DBF, the subtraction is via numerical computation.

Furthermore, knowledge gained by tracking the potential interference locations may be used to dynamically adjust the transmit antenna patterns to minimize transmitted signals that might cause interference in the directions of other systems. Initially, the terminal may have no a priori knowledge of the direction of arrival of the interfering signal. Therefore, an algorithm may be used to systematically command the direction of the Beam2 113 over a prescribed angular range, progressively away from the desired beam direction, which in the extreme, could be over an entire hemisphere or more.

In one example embodiment, at each beam scan direction, the interference reduction processor 150 detects the presence and amplitude of an interfering signal in 159 and compares it to a predetermined threshold value. At each beam direction where the interference is above the threshold, a processing device, such as a computer processor for example, samples the interference at 157 and stores it and the corresponding beam direction. The processor then points Beam2 to the strongest interference signal direction that was stored for control via the feedback loop and tracks that beam for further signal cancellation processing. The interfering signal at 157 has been processed by the configurable filter 156 for reduction of extraneous noise, amplifier 155 for increasing the amplitude of the sample for further processing, phase delay 154 for varying the phase of the sample, and attenuation for fine control of the sample amplitude 153, where the processing steps are controlled by the controller 159. The combiner algebraically adds the processed interfering signal with the desired Beam1 at 152.

For an electronic beam scanning system and for most practical mobile or non-GEO satellite environments, this process is sufficiently rapid and the beam directions for desired and undesired signals recorded for a few time intervals allow even more rapid identification of the interference.

Figure 5:
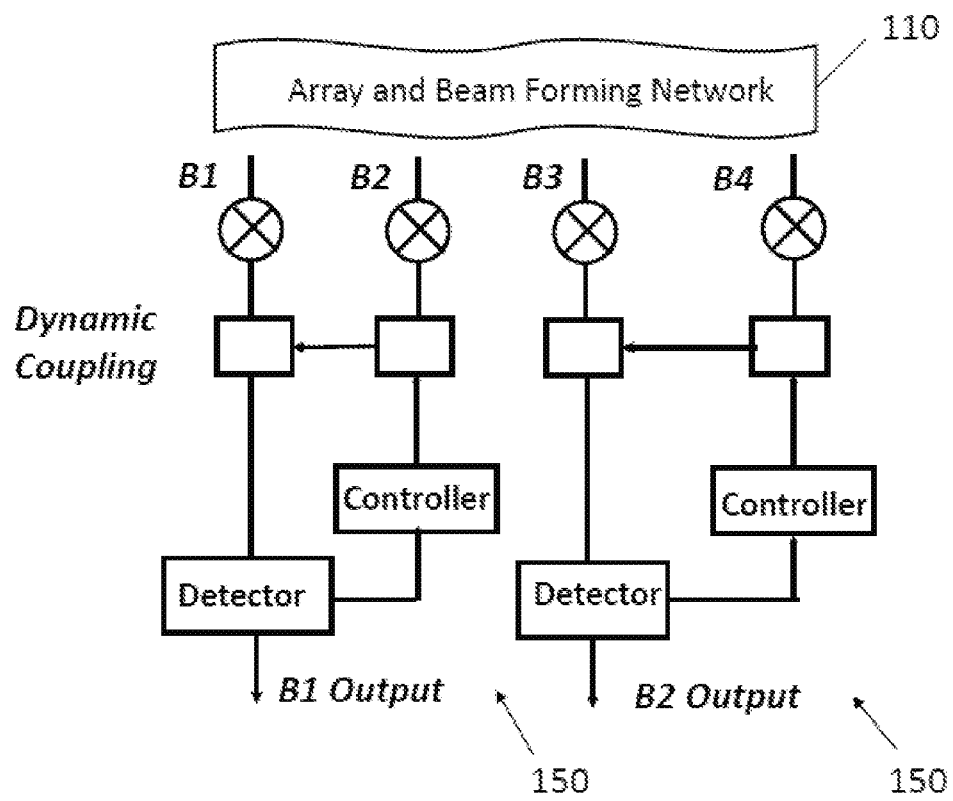
FIG. 5 shows a generalization to multiple cancellation paths.

Referring to FIG. 5, the invention can be applied to more than two beams wherein cross-coupling is effected among several desired beams and several interference sources, shown here for the example case of two interferers. Further, the cancellation process sends information to the antenna's transmitter functions, either in the same aperture or a separate nearby aperture generally on the same platform, to adjust its transmit pattern to mitigate transmitted radiation from a co-located transmit antenna to reduce its radiation in the direction of a receive node, such as an adjacent satellite. For example, if interfering signals B2 and B4 are from adjacent satellites to desired beams B1 and B3, the directions of B2 and B4 are known and this information can be used to modify the sidelobe patterns of the transmit antennas co-located with the receive antenna functions B1 and B3 to reduce uplink (transmit). In all cases, the general process may be applied both to analog beam forming antennas or digital beam forming networks with appropriate steps in each domain.

In addition to configurations where the number and direction of the interferer is known a priori for a given desired target position, the invention may be extended in a manner from that shown in FIG. 5 for two beams and two interferers to a system with three or more beams where the first beam continually tracks and receives (downlink) signals from a desired source or node. Here, a second beam with the same or different performance continually scans across the field of view with knowledge of the radiation pattern of the first beam to search in real-time for potential sources of interference, and any additional directive beams with the same or different performance are assigned in order to continually scan and track the located interference sources in order of severity. Accordingly, the third beam can be used to cancel the interference due to the strongest located interferer, the fourth beam can be used to cancel the interference of the second strongest located interferer, and so on.

FIG. 5 illustrates the invention concept to multiple desired beams and multiple interferers 150. In this case, B1 and B3 represent two desired signal and beam paths while B2 and B4 represent beams pointed to interferers as a function of time. The circuit components 153-156 are also included in the circuit of FIG. 5, but not shown for ease of illustration. Of course, the system 100 can be utilized with more beams by using the multiple ports of a multiple beam antenna. In all cases, the interference reduction is accomplished dynamically in real-time as a function of time with continual beam scanning and interference reduction, without user input.

Figure 6:
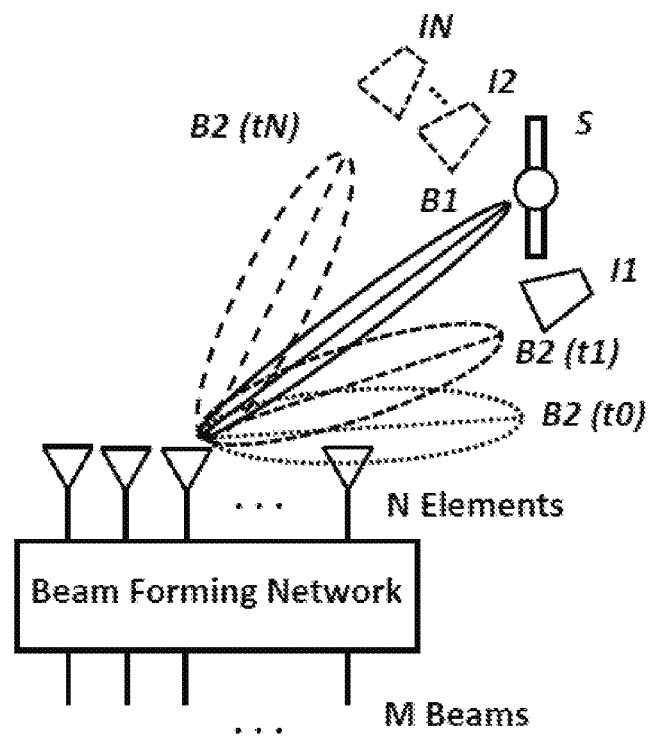
FIG. 6 shows a continuous scan for mapping and monitoring interferers.

FIG. 6 illustrates a configuration of the invention generalized for mapping out interference sources at multiple angular locations. In this case, S represents the desired signal, and I1, I2, . . . IN represent interference sources at unknown strengths and locations at angular locations distributed around S. The antenna tracks beam B1, the desired signal source S for direct communications purposes, and continually scans beam B2, which may have different performance than B1 but is generated by the same antenna aperture, in a designated search pattern.

Accordingly, in one embodiment for example, at time t0 it forms B2(t0), at time t1 it forms B2(t1), and so forth. At each instance, the signal received from Beam B2 at whatever direction it is directed is detected and compared with a predetermined threshold level for signals sources that could be potential interferers with the desired signal S. Properties of these candidate interferers are then recorded in a processing device connected to the signal outputs 152 and 157 of each of the interfering beams, and the search continues. One or more interference sources are tracked wherein the beam direction and interference level are stored based on their level of interference above the threshold level to the desired signal S based on the known radiation pattern and sidelobe properties of Beam B1. The system can take actions to mitigate the interference using the systems and methods of FIGS. 1-5.

Figure 7:
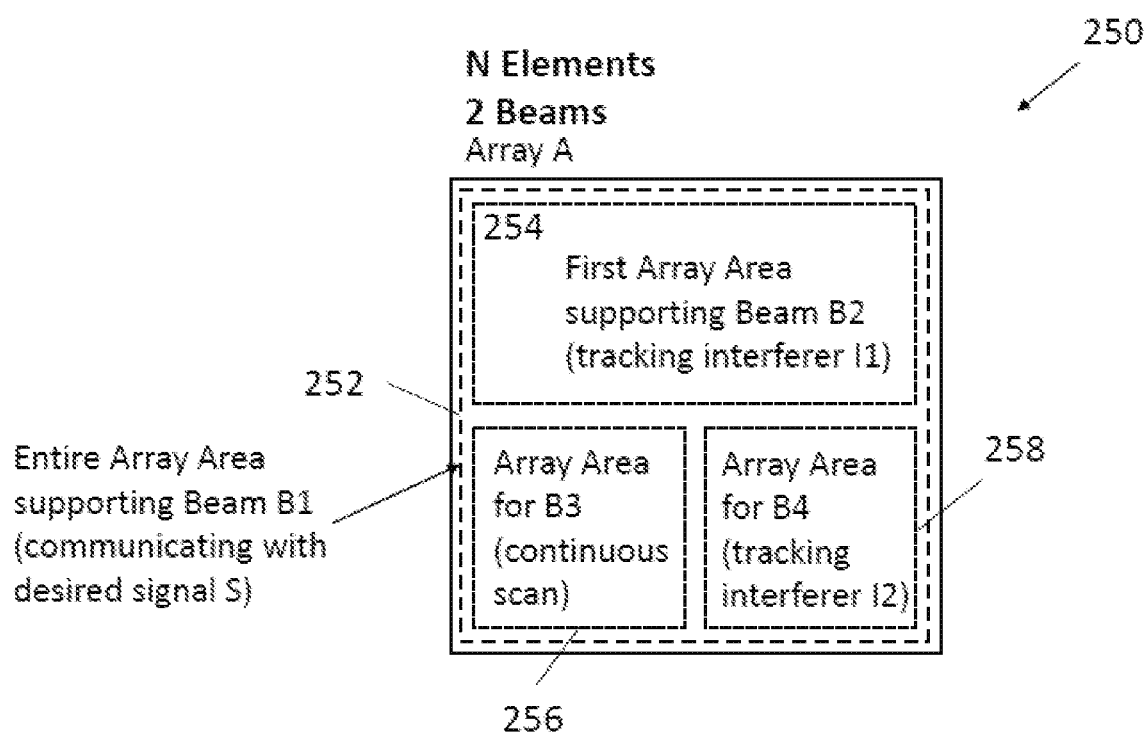
FIG. 7 shows dynamically segmented arrays for alternative ways to achieve additional beams.

FIG. 7 shows an antenna array device 250 in accordance with one embodiment of the invention. An array antenna that supports only two beams can be segmented into distinct geometric regions for the purpose of generating lower-gain secondary beams, so as to allow tracking more than a single interferer I1, also allowing tracking and cancellation of a second interferer I2, or monitoring the surrounding environment with continuous scan, all without altering the performance of the primary beam and desired signal.

Here, the antenna array device 250 includes an array area 252, a first antenna array area 254, a second antenna array area 256, and a third antenna array area 258. The array area 252 forms the entire array area for the device 250 (shown in large dashed lines), including the first, second and third antenna array areas 254, 256, 258 (shown in small dashed lines). Array areas 254, 256, and 258 taken together are the same as the entire array area 252. The entire array area 252 supports Beam B1 that communicates with the desired signal S. The elements making up the entire array 252 support contributing to two beams each, so while the entire array is contributing to Beam B1, 252 can be segmented into 254, 256, 258 for the purpose of generating the second beam in each case. The first array area 254 includes about one-half of the entire array area 252 and supports Beam B2 that tracks interferer I1.

The second and third array areas 256, 258 together occupy the other approximately one-half of the entire array area 252. Each of the second and third array areas 256, 258 occupy about one-quarter of the entire array area 252. Each of the first, second and third array areas 254, 256, 258 can have any suitable size and shape, and here are shown to have a square or rectangular shape, as does the entire array area 252. The second array area 256 supports Beam B3 that performs a continuous scan. The third array area 258 supports Beam B4 that tracks interferer I2.

Each of the first, second and third array areas 254, 256, 258 have one or more elements (not shown), such as the antenna elements 114 of FIG. 1. In one embodiment, each area 254, 256, 258 has a plurality of elements. Those elements support the signal communication for that respective array area 254, 256, 258. The aperture areas must be chosen as a trade depending on the total available area, the desired signal reception and transmission properties and the expected levels of interference. The different sizes of the areas may be controlled the processor 150 by selecting which subsets of the overall aperture are connected to receive the signal and to support the number and relative magnitude of the desired beams and interferers.

As shown, area 254 is larger than areas 256 and 258, for an interferer I1 that is stronger than interferer I2 that is traced by beam B3. The arrangement and distribution of the areas within the array is not unique, and many different geometric segmentations of the aperture may be selected without changing the fundamental principles of the invention. The array 250 is illustrated as square, but may be circular, rectangular, or any other shape, planar or non-planar, and the one or more segmented array areas for the second beams 254, 256, 258 may then be any shape or geometry that segments the original array. The shape of the array 250 is chosen for the properties of the primary beam B1 and the application for which the array is intended. The size and the number of elements in 250 may be large or small, from tens to thousands of elements, which is driven by the required gain of the primary beam B1. The number of elements that are used for each area will be determined by the required gain to resolve each of the one or more interfering signals I1, I2 up to the full number of elements in the array as designed for the specific application.

The array device 250 supports many beams of varying performance from a single phased array aperture consisting of N elements supporting a total of two independent Beams B1, B2. In this way, every element in the array is used to generate both Beam B1 and Beam B2. In the configuration shown in FIG. 7, beam B1 is produced by the entire array 252 to maximize performance for a downlink connection from a signal source. Lower-performance beams can be used for other purposes, such as continuous scan for mapping interference sources (e.g., B3) in real-time, and canceling interference from individual interference sources (e.g., B4). Scanning takes place by commanding the beam to be steered in an angular search pattern (that may be a regular or random search) to cover the angular region of interest for potential interferers, and noting the power spectral density or other measure known in the state of the art for characterizing the presence or absence of a signal from each angle. The signal presence or absence for the angles considered would be stored by the processor 150, and used to identify the interferers to be corrected.

For this reason, the array device 250 can be configured to allow the second beam of the array to operate as a single beam (e.g., B2), or to be segmented in a dynamic and real-time fashion such that each segment or area 254, 256, 258 forms its own aperture that is separate and distinct from the others and therefore each area is able to operate independently of each other with simpler circuitry and therefore lower cost for the entire ensemble than building an array that supports 3, 4, or more beams from the array as a whole.

As further illustrated, the elements making up area 252 are divided into areas 254, 256, and 258 for the purpose of forming secondary beams, but more or fewer segments is also allowed. This segmentation now supports forming simultaneous transmit/receive beams B1, B2, B3, B4 from 252, 254, 256, 256 simultaneously, where the performance of each beam is dependent on the size of the area used to create it. Beam B1, as it is generated by the entire array, has the highest gain and performance. Beams B2, B3, B4, as they are only generated by subsets of the array, have proportionally smaller gain. The area used to generate each beam can be selected by the processor 150 to match the relative signal strengths of the one or more interferers. Beam B3 is used to perform continuous scanning for potential interferers, and Beams B2 and B4 are used to cancel the interferers I1 and I2 respectively that were located by B3. Dividing the area of the beam into separate independent sectors does not increase the complexity of the array, but allows for additional functionality to be applied.

Antenna Apertures

The present invention can be applied to an antenna system 100 that supports generation of multiple beams from a single aperture. The invention can also be applied to an antenna system that generates multiple beams from separate and distinct coordinated sub-apertures, as shown in FIG. 7. However, an advantage would accrue to a multiple beam antenna that uses a single full aperture to form its beams. For example, a full aperture compared with two sub-apertures (each with one-half the area of the full aperture, as shown in FIG. 7) to generate each beam, would provide a signal strength that is roughly double if the entire aperture were used to communicate with the target signal source. In addition, a full aperture provides an increased available signal-to-noise ratio that better enables subtraction of the interfering source compared to the case where half of the aperture is used to communicate with the signal source, and half the aperture were used to cancel an interferer. The effect of using the entire array increases the base gain of the antenna but also reduces the beamwidth, both of which would help to reduce the impact of interferers at nearby angles.

For an antenna that uses the full aperture instead of smaller separate sub-apertures to generate multiple beams, making use of the additional beams to mitigate one or more interferers, the receive performance of the system is improved by utilizing the full area or real estate for a given installation. This is particularly useful in a mobility SATCOM environment, where performance is dominated by thermal noise and the gain-to-noise temperature ratio should be maximized for a given available installation platform size. The platform size will commonly restrict the size of the aperture that can be installed, which then places a limit on the performance. The small aperture sizes associated with separate sub-apertures also provide less dynamic range for interference rejection than a large, high-gain installation. Adding one or more beams for interference cancellation from nearby interferers to a full aperture mobility terminal maximizes the utility of the installation area and is a desirable way to improve communication throughput.

However, by adding a continually or rapidly-scanning beam, multiple beneficial behaviors or capabilities are enabled. First, the real-time map of time-varying interferers allows interference avoidance or cancellation by use of an additional beam or beams. Second, monitoring the sky for available satellites that could be switched to allows capability similar to that of carrier or tower aggregation in the terrestrial cellular communications market, enabling satellite or link aggregation. By keeping an up-to-date real-time internal model of available satellites, this minimizes the time necessary to search for a new connection if subjected to a sudden blockage. By adding machine learning and big data techniques to this analysis across a collection of terminals or even over an entire network, heuristic models of signal blockage and mitigations can be developed that enable such features as preemptive alternate beam acquisition to maintain a modem lock prior to a handover and, in case of loss of carrier on the primary beam, maintaining multiple links simultaneously. These models are created and stored in the processor 150. An example of such a model would store a list of performance-affecting events (handover, blockage, interference), along with times and locations, and an algorithm to look for patterns in the list so as to predict the occurrence of future events and compensate for the expected event before it occurs.

APPLICATIONS OF THE INVENTION

Accordingly, the invention provides design architectures and methods to mitigate interference in a variety of dynamic time varying environments that require continual beam scanning by independent multiple beams. These include, for example, stationary communications platforms where the antenna beam or beams forming the link may be reassigned from one satellite to another. That might be the case for a satellite roaming application where traffic is routed among several different satellites and/or operators.

The continual scanning using a variety of known techniques such as varying the phase or time delay shifts of a phased array or switching among ports of a Butler matrix feed, or selecting among the multiple beams of a DBF array, can also be applied to mobile platforms communicating with geostationary satellites where the desired and interfering directions are continually changing.

The continual beam scanning can also be applied to mobile or stationary platforms communications with non-geostationary satellites such as those in low or medium earth orbit where the satellites are moving across the sky.

Continual beam scanning can further be applied to mobile or stationary platforms where the desired link is continually tracking but potential interferers whether spaceborne or terrestrial, arise from different directions. In addition, continual beam scanning can be applied to combinations of the above scenarios including movement tracking of the desired node with stationary or moving interference sources.

The multiple beam system can be used to mitigate interference in terrestrial networks and hybrid satellite-terrestrial networks such as active connections with the same or different satellite, constellation, orbit, beam, or frequency are allocated for different communication purposes based on service level agreements (SLAs) or to prioritized data based on cost and time of day, for link management such as in 3GPP-style networks including 5G It is further noted that the description and claims use several geometric, positional, or relational terms, such as square, rectangular, flat, planar and side-by-side. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly rectangular but still be considered to be substantially rectangular because of, for example, roughness of surfaces, tolerances allowed in manufacturing, etc. And, other suitable geometries and relationships can be provided without departing from the spirit and scope of the invention.

The system and method of the present invention can further include a processing device, such as and including the processor 150, 160, and/or the transmit beam processor, which in one embodiment can be operated by computer software that permits the accessing of data from an electronic information source. The software and the information in accordance with the invention may be within a single, free-standing processing device or it may be in a central processing device networked to a group of other processing devices. The software and information may be stored on a computer hard drive, or on any other appropriate data storage device. The entire operation is conducted automatically by the processor, and without any manual interaction.

Accordingly, unless indicated otherwise the process can occur substantially in real-time without any delay or manual action or other user input.

This invention could be applied to satellite and terrestrial communications, including point-point microwave and 5G, to radar and remote sensing, and jamming mitigation.

The foregoing description and drawings should be considered as illustrative only of the principles of the invention. The invention may be configured in a variety of shapes and sizes and is not intended to be limited by the embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A multiple beam antenna system, comprising:
   an interference reduction device configured to form a first antenna beam that continually and dynamically acquires and tracks a desired signal having a source or node location that varies with time, said desired signal having a desired beam channel or path with one or more undesired signals interfering with the desired beam from one or more undesired interfering source(s) or node(s) at other location(s) that varies with time with respect to the source or node location; and
   said interference reduction device further configured to form one or more second antenna beam(s) that each continually seeks, acquires, and tracks the one or more undesired signal(s) from the other location(s) that varies with time and processes the one or more undesired signals from those undesired interfering source(s) or node(s) to continually reduce or cancel the changing interference in the desired beam channel or path by subtracting or cancelling the one or more undesired signals from the desired signal.

2. The system of claim 1, further comprising a plurality of first antenna beams and a plurality of one or more second antenna beam(s), wherein multiple undesired signals are tracked and processed to reduce interference in the desired signal.

3. The system of claim 2, wherein the plurality of first antenna beams and the plurality of the one or more second antenna beam(s) are processed at radio frequencies of an antenna terminal, or the intermediate frequencies of the antenna terminal, or at baseband of the antenna terminal.

4. The system of claim 3, wherein the desired signal is demodulated and processed in either the analog or digital domains to reduce or cancel interference.

5. The system of claim 1, wherein the first and second antenna beams are formed by multiple continuously variable phasing or time delay circuits applied to the radiating elements.

6. The system of claim 1, wherein the first and second antenna beams are formed by multiple independent phasing, time delay networks, Butler matrices, Rotman lens, reflector or lens and feed arrays.

7. The system of claim 1, wherein the first and second antenna beams are formed and processed in the digital domain.

8. The system of claim 1, wherein the antenna is communication with or in the presence of GSO, NGSO, and/or terrestrial signal and interference sources.

9. The system of claim 1, where the antenna may be mounted in a fixed position or a mobile platform, such as land, air, and sea vehicles.

10. The system of claim 1, said interference reduction device comprising an amplitude attenuator, a phase shifter, a detector and a controller, said detector detecting a magnitude of the undesired interfering signal and said controller controlling said amplitude attenuator and/or said phase shifter to adjust an amplitude and/or phase of the undesired interfering signal to reduce or cancel the interference in the desired beam channel or path.

11. The system of claim 1, wherein multiple beams are formed by, subdividing an aperture for the second antenna beam into two or more searching, tracking, or interference mitigation beams while the first beam remains in use for communication with a target signal source or node.

12. The system of claim 1, where information from the received first antenna beam are used to control transmission radiation properties of a transmit antenna to minimize interference.

13. A multiple beam antenna system comprising:
    an interference reduction device configured to form a first antenna beam that continually and dynamically acquires and tracks a desired signal source or node;
    said interference reduction device configured to form a second antenna beam that continually scans across nearby angles to dynamically locate and quantify potential interference sources; and
    said interference reduction device configured to form a third antenna beam that continually acquires and tracks interference from an interference source that was located by the second antenna beam and processes the interfering signals to subtract or cancel the interference from the desired signal,
    wherein a location of the desired signal source or node varies with time with respect to a location of the interference source.

14. The system according to claim 13, wherein a number of antenna beams are equal or less than a number of antenna elements.

15. The system of claim 13, wherein knowledge of the radiation pattern of the first beam, including the magnitude and direction of major sidelobes, is stored and used by the system to prioritize in a real time fashion based on the interference level relative to a predetermined threshold the list of possible interferers and their properties based on their predicted impact on the first beam.

16. The system of claim 15, wherein the prioritized list of real time interferers is used to select the direction and signal combination characteristics of the one or more interference mitigation beams.

17. The system of claim 13, where antenna aperture distribution and transmit beam directions and patterns are optimized by amplitude and phase control of the aperture distribution to mitigate uplink interference.

18. The system of claim 13, wherein the second beam is used in an environment where SATCOM connection roaming between different satellites, constellations, orbits, or spot beams is enabled to, in addition to searching for interferers, maintain a real time list of signal strengths and available alternate satellites in the same network.

19. The system of claim 18, wherein one or more additional beams at the same or lesser performance level as the first beam are used to preemptively connect to one or more alternative satellites or spot beams to minimize the handover time in case of a blockage or signal drop out on the first beam.

20. The system of claim 19, wherein artificial intelligence (AI) including machine learning or deep learning techniques are used to correlate interferer locations, target satellite locations, link performance, alternate satellite locations and the real time performance and interference map with ground location and terrestrial conditions to preemptively and automatically switch between beams or acquire secondary simultaneous connections to allow for link diversity or link aggregation, satellites, constellations, orbits, beams, or frequencies based on past experience of the individual terminal and of the communications network as a whole.

21. The system of claim 13, wherein multiple active connections with a same or different satellite, constellation, orbit, beam, or frequency are allocated for different communication purposes based on service level agreements (SLAS) or to prioritized data based on cost and time of day, for link management such as in 3GPP style networks including 5G.

22. The antenna system of claim 13, further comprising a plurality of lens sets forming a phased array, each lens set having a plurality of feed elements that each form one of the first antenna beam and the second antenna beam at one of a plurality of desired directions.

23. The antenna system of claim 22, wherein a subset of the lens array forms the third antenna beam.

24. A multiple beam antenna system, comprising:
an interference reduction circuit configured to continually and dynamically track a first antenna beam having a desired signal from a desired signal source and a second antenna beam having a potential interference signal from a potential interference source, and to adjust the amplitude and/or phase of the first antenna beam to subtract or cancel interference from the potential interference source by subtracting or cancelling the potential interference signal from the desired signal, wherein a location of the desired signal source varies over time with respect to a location of the potential interference source.

25. The system of claim 24, said interference reduction circuit comprising a phase adjuster and an amplitude adjuster, and a controller controlling the phase adjuster and amplitude adjuster to adjust a phase and/or amplitude of the first antenna beam.

26. The system of claim 25, said interference reduction circuit further comprising a detector to detect one or more properties of the second antenna beam, said controller controlling the phase adjuster and amplitude adjuster based on the detected one or more properties.

27. A method for operating a multiple beam antenna system, comprising:
continually and dynamically tracking a antenna beam having a desired signal from a desired signal source;
continually and dynamically tracking a second antenna beam having a potential interference signal from a potential interference source, whereby a location of the desired signal source varies with time with respect to a location of the potential interference source; and
adjusting an amplitude and/or phase of the first antenna beam to eliminate or reduce interference from the potential interference source by subtracting or canceling the potential interference signal from the desired signal.

* * * * *